(No Model.)
E. TAKKEN.
WHEEL.
No. 464,837. Patented Dec. 8, 1891.
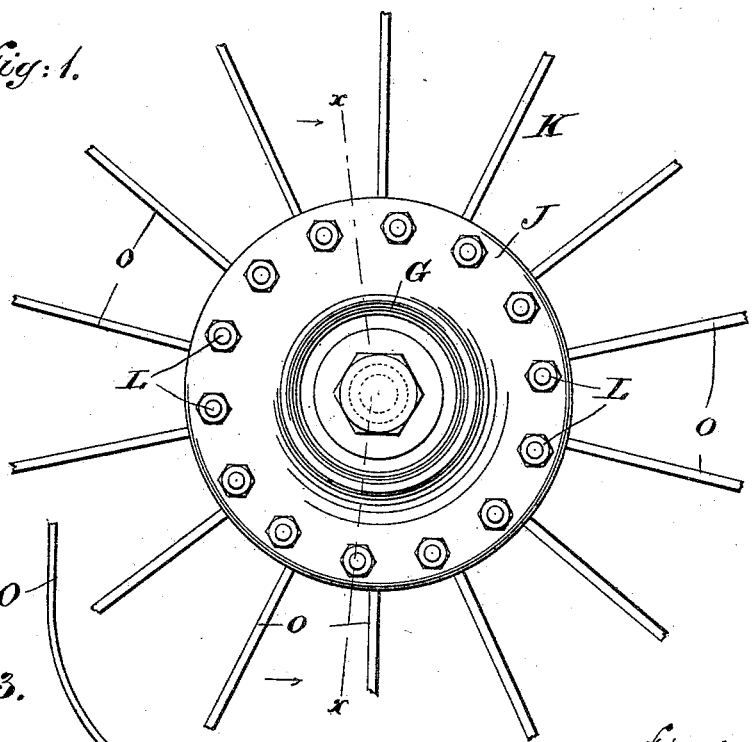
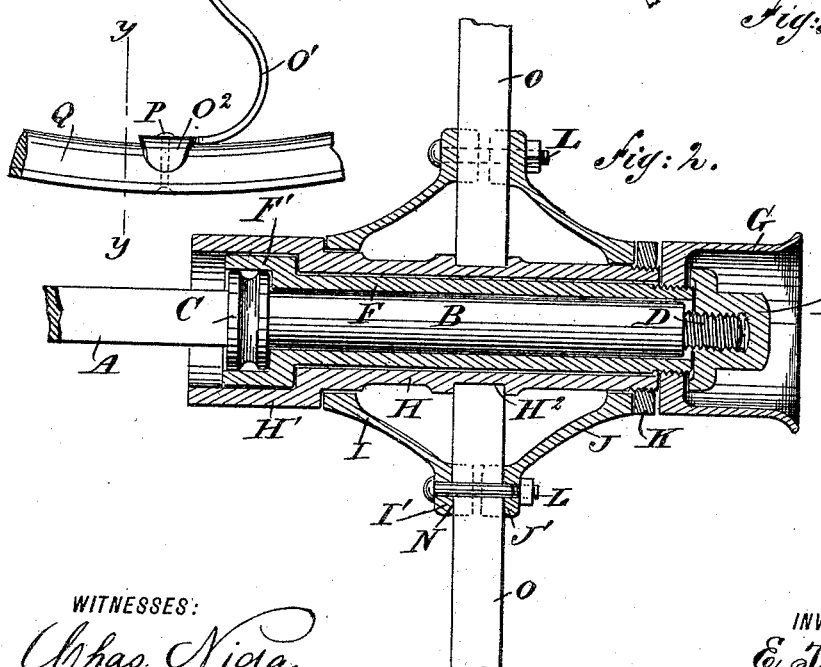
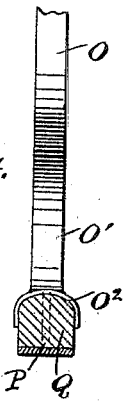
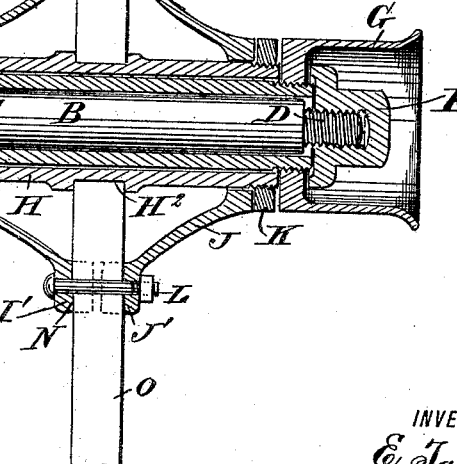
WITNESSES:
Chas. Niola.
C. Sedgwick.
INVENTOR
E. Takken
BY Munn & Co.
ATTORNEYS.

UNITED STATES PATENT OFFICE.

EVERT TAKKEN, OF DOUGLAS, MICHIGAN.

WHEEL.

SPECIFICATION forming part of Letters Patent No. 464,837, dated December 8, 1891.

Application filed April 30, 1891. Serial No. 391,024. (No model.)

*To all whom it may concern:*

Be it known that I, EVERT TAKKEN, of Douglas, in the county of Allegan and State of Michigan, have invented a new and Improved Vehicle-Wheel, of which the following is a full, clear, and exact description.

The object of the invention is to provide a new and improved vehicle-wheel, which is simple and durable in construction, readily adjustable to take up all wear, and easily repaired in case of injury.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a side elevation of the improvement. Fig. 2 is a transverse section of the same on the line $x\,x$ of Fig. 1. Fig. 3 is a side elevation of the outer end of the spoke and part of the rim of the wheel, and Fig. 4 is a transverse section of the same on the line $y\,y$ of Fig. 3.

The axle A is provided with the usual bearing B, formed on its inner end with a collar C and its outer end with a bolt D, on which screws a nut E. On the bearing B is arranged a sleeve F, formed at its inner end with a cylindrical offset F', extending over the collar C. On the outer end of the sleeve F is formed a screw-thread, engaged by a cap G, held in place by the nut E, which engages with its inner surface both the end of the sleeve F and the inside of the cap G, as plainly shown in Fig. 2.

On the sleeve F is arranged the hub H, formed on its inner end with a cylindrical offset H', fitting over the cylindrical offset F' of the sleeve F. On this hub H are held the rings I and J, preferably made in dish form, as plainly illustrated in Fig. 2, the ring I fitting against the cylindrical offset H', while the ring J is held in place on the outer end of the hub by a nut K, screwing on the threaded end of the said hub.

The rings I and J are formed with parallel flanges I' and J', respectively, bolted together by suitable bolts L, extending through the said flanges close to the spokes O, fitting through recesses N in the flanges I' and J'. The inner end of each of the spokes O engages a recess $H^2$, formed in the periphery of the hub H, so that displacement of the spoke in the hub is prevented. The outer end of each of the spokes is preferably formed with a bent part O', formed at its extreme outer end with a saddle $O^2$, engaging the inner surface and part of the sides of the rim Q of the wheel. A bolt P fastens the saddle to the rim, as plainly illustrated in Figs. 3 and 4.

It will be seen that when the several parts are in place, as illustrated in Figs. 1 and 2, and the bolts L are screwed up the spokes O are securely held in place in the rings I and J, as well as on the hub H. The latter again is fastened in place on the sleeve F by screwing up the nut K.

The lateral displacement of the hub H is prevented by the inner end of the said hub abutting with the offset H' on the offset F' of the sleeve F. An outward movement of the hub is prevented by the cap G, held with its inner face close to the end of the hub H. The several parts are preferably made of metal, so as to be very strong and durable.

A vehicle-wheel constructed in this manner can be readily adjusted to take up all wear, and it can be easily repaired in case of being injured.

Having thus described my invention, I claim as new and desire to secure by Letters Patent—

1. A hub H, having a shoulder near one end, external threads at its opposite end, and spoke-sockets between said shoulder and threads, the two collars I J on the sleeve H and formed on their inner adjacent faces with opposed spoke-recesses, and a separate and independent nut K, screwed on the threaded end of the sleeve, substantially as set forth.

2. The combination, with the hub H, having a cylindrical offset H' at its inner end, forming internal and external shoulders, and external screw-threads at its opposite end, the spoke-clamping rings I J, and their clamping-nut K, of the sleeve F, having a cylindrical enlargement F' within enlargement H', projecting at its opposite threaded end beyond the threaded end of the hub, and the cap G, screwed on the said projecting end, substantially as shown and described.

3. A vehicle-wheel comprising a hub formed at its inner end with an offset, dished rings supported on the said hub, one of the rings abutting against the said offset and both of the rings being formed with parallel flanges having recesses, spokes extending through the recesses in the several rings into recesses in the said hub, a nut screwing on the outer threaded end of the said hub against the outermost ring, and bolts for fastening the flanges of the said rings together, substantially as shown and described.

4. In a vehicle-wheel, the combination, with a sleeve held on the axle-bearing and formed with a cylindrical offset, of a hub fitting upon the said sleeve and provided with a cylindrical offset fitting over the offset of the said sleeve, an inner ring abutting against the offset of the said hub and formed with a flange having recesses, a second ring fitted upon the said hub and also provided with a flange having recesses corresponding to the recesses on the other ring, bolts for fastening the flanges of the rings together, and spokes passing through the recesses in the said rings into recesses on the said hub, substantially as shown and described.

5. In a vehicle-wheel, the combination, with a sleeve held on an axle-bearing and formed with a cylindrical offset, of a hub fitting upon the said sleeve and provided with a cylindrical offset fitting over the offset of the said sleeve, an inner ring abutting against the offset of the said hub and formed with a flange having recesses, a second ring fitted upon the said hub and also provided with a flange having recesses corresponding to the recesses on the other ring, bolts for fastening the flanges of the rings together, spokes passing through recesses in the said rings into recesses in the said hub, and a nut screwing on the outer threaded end of the said hub, substantially as shown and described.

EVERT TAKKEN.

Witnesses
MARTIN GRAY,
IRVING DEWEY.